(12) United States Patent
Shayne

(10) Patent No.: US 7,946,739 B2
(45) Date of Patent: May 24, 2011

(54) OVEN MITT WITH SOUND, LIGHT AND VIDEO

(76) Inventor: Linda Shayne, Santa Monica, CA (US)

( * ) Notice: Subject to any disclaimer, the term of this patent is extended or adjusted under 35 U.S.C. 154(b) by 432 days.

(21) Appl. No.: 12/011,560

(22) Filed: Jan. 28, 2008

(65) Prior Publication Data

US 2009/0293166 A1  Dec. 3, 2009

Related U.S. Application Data

(60) Provisional application No. 60/966,479, filed on Aug. 28, 2007.

(51) Int. Cl.
*F21V 33/00* (2006.01)
(52) U.S. Cl. .................. 362/385; 362/124; 2/20; 2/158
(58) Field of Classification Search ................ 2/20, 158; 381/385, 124
See application file for complete search history.

(56) References Cited

U.S. PATENT DOCUMENTS

| | | | |
|---|---|---|---|
| 2,889,556 A | 3/1958 | Mehler | |
| 3,638,011 A | 1/1972 | Bain | |
| 5,177,467 A * | 1/1993 | Chung-Piao | 340/574 |
| 7,038,575 B1 * | 5/2006 | Frohman et al. | 340/384.7 |
| 2006/0104056 A1* | 5/2006 | O'Brien et al. | 362/227 |
| 2008/0137898 A1* | 6/2008 | Nenner | 381/385 |

\* cited by examiner

*Primary Examiner* — Laura Tso

(57) ABSTRACT

A hand protective cooking apparatus, usually referred to an Oven Mitt and/or Pot Holder, including a combination of sound, light and video electric generating devices, including a power source, grouped as an electronic assembly secured into the body of the hand protective cooking apparatus. Sound, light and video combinations generated by the hand protective cooking apparatus, may entertain, inform, advertise and illuminate. A programmed sound chip, radio, MP3 player, television and Walkie-Talkie maybe embedded in the electronic assembly. Furthermore, the hand protective cooking apparatus has thematically integrated sounds, visuals, fabric design and a removable attached greeting card to strengthen the entertaining, informational, advertising, promotional, souvenir and gift value.

21 Claims, 8 Drawing Sheets

OVEN MITT WITH SOUND, LIGHT AND VIDEO

This application claims priority from application 60/966,479 filed Aug. 28, 2007

TECHNICAL FIELD

The present invention relates to sound generating and/or light generating and/or audio and/or audio-visual devices.

More particularly, the present invention relates to hand protective cooking apparatus, typically used to protect the hand of a user from heat during food preparation, commonly referred to as an Oven Mitt and/or Pot Holder. An Oven Mitt and/or Pot Holder is a hand protective apparatus that allows a user to handle hot objects, such as cooking utensils, pans, pots, containers or foods and to manually handle hot objects near or in and out of ovens, grills and barbeques. An Oven Mitt and/or Pot Holder, is typically comprised of an exterior layer of fabric, an interior section of heat barrier or insulating material and an interior layer of fabric, it can often be quilted, but is not necessarily quilted. The oven mitt and/or pot holder is a hand protecting apparatus which allows a user to hold hot cooking utensils and pans, which are as hot as 300 degrees Fahrenheit, for a minimum of 20 seconds, without causing the user pain and without scorching or burning the apparatus itself. Even higher heat and time thresholds are possible and may be preferred. The oven mitt and/or pot holder can be made of fabric, such as cotton, or of other materials. A thermal radiation barrier to protect against scorching of the material, may be made of a metal coated fabric or film, for example aluminized cotton or polyester, aluminized kapton or mylar. An insulating barrier to protect against heat in the gripping area may include an elastomeric material, such as silicone, rubber or urethane. The heat barrier or insulating material may also be made of cotton batting or of other heat barrier or insulating materials. Other designs of hand protective mitts exist different than the above described. The preferred embodiment of the invention uses the described type of fabric, heat barrier or insulating material, fabric structure, but this is not mandatory during manufacturing.

More particularly, the present invention relates to sound generating devices to be used in connection with hand protective cooking apparatus, in particular oven mitts, gloves, mittens, pot holders and related accessories which are designed to produce musical and entertaining, informational or affectionate sounds, such as laughter, kisses, songs, musical instruments, jingles, advertising, cooking recipes, humorous and affectionate or advertising verbal messages, puns, double entendres and the like.

More particularly, the present invention relates to sound generating devices to be used in connection with hand protective cooking apparatus, in particular oven mitts, gloves, mittens, pot holders and related accessories which are designed to produce musical and entertaining, informational or affectionate sounds, such as laughter, kisses, songs, musical instruments, jingles, advertising, cooking recipes, humorous and affectionate or advertising verbal messages, puns, double entendres and the like, and the sounds are activated in the process of cooking, by simply grabbing hold of an object.

More particularly, the present invention also relates to light generating devices to be used in connection with hand protective cooking apparatus, in particular oven mitts, gloves, mittens, pot holders and related accessories which are designed to produce light for either or both entertainment value and luminescent practical value. More particularly the lights can be programmed to blink amusingly in different patterns in correspondence to the different sounds. Especially relevant is that the light generating aspect can be useful to illuminate the food that is being prepared in the oven, microwave, at a barbeque or in a refrigerator, or at any time during food preparation. The light or lights can be white, colored or a combination of white and colored. The lights are aimed in a way so the light beams converge to one beam so that there is optimal illumination of the food while it is cooking, which is more illuminating than a simple overhead oven, microwave or refrigerator light, or in the case of a barbecue, a porch light.

More particularly, the present invention relates to sound generating devices to be used in connection with hand protective cooking apparatus, in particular oven mitts, gloves, mittens, pot holders and related accessories which are designed to let the user hear musical and entertaining sounds, and/or information and/or advertising messages programmed on a sound chip, or sports scores, news, or other audio entertainment or information via a radio, with or without a light generating device.

More particularly, the present invention relates to sound, with or without video generating devices to be used in connection with hand protective cooking apparatus, in particular oven mitts, gloves, mittens, pot holders and related accessories which are designed to let the user hear musical and entertaining sounds, and/or information and/or advertising messages programmed on a sound chip, including or not including accompanying visuals, via an MP3 player or other media storage device, with or without a light generating device.

More particularly, the present invention relates to sound and video generating devices to be used in connection with hand protective cooking apparatus, in particular oven mitts, gloves, mittens, pot holders and related accessories which are designed to let the user hear and see musical and entertaining sounds, and/or information and/or advertising messages and visuals via a television, with or without a light generating device.

More particularly, the present invention relates to sound and video generating devices to be used in connection with hand protective cooking apparatus, in particular oven mitts, gloves, mittens, pot holders and related accessories which are designed to let the user hear and see entertaining sounds, and/or information and/or advertising messages, and visuals via an electronic Video Device, with or without a light generating device.

More particularly, the present invention relates to sound generating devices to be used in connection with hand protective cooking apparatus, in particular oven mitts, gloves, mittens, pot holders and related accessories which are designed to let the user communicate with one or more people via a Walkie-Talkie, with or without a light generating device.

More particularly, the present invention relates to a gift card to be used in connection with hand protective cooking apparatus, in particular oven mitts, gloves, mittens, pot holders and related accessories which are designed to the user hear musical and entertaining sounds, and/or information, and/or advertising messages, including or not including accompanying visuals, with or without a light generating device.

BACKGROUND OF THE INVENTION

People who cook and prepare food may be alone or often have children, family and friends and employees or employers around them. To create an atmosphere of fun, humor, romance in the home, or outside at the barbeque, or to promote fun, joy or corporate loyalty in a restaurant, company kitchen or fast food establishment, hotel or work kitchen, on any day or for a special event such as a birthday party or holiday or company event or to create fun on an average day while preparing meals, the hand protective cooking apparatus, in particular the oven mitt and/or pot holder with sound(s) and/or light(s) will bring an element of joy, humor, love, fun and surprise. The sounds and/or lights and/or visuals generated by the oven mitt and/or pot holder will bring an atmosphere of joy, surprise and celebration to the process of cooking and will make what could be perceived as a chore, much more entertaining for the person wearing the oven mitt and for those who are around the person. A hand protective oven mitt is often worn and/or a pot holder is held, while preparing food and while serving food and the sound and/or light/with or without video are generated in the process of using the oven mitt and/or pot holder while cooking or serving, or can be generated by the user just for amusement. The sounds can also be generated for informational purposes, for example cooking recipe instructions can be programmed on the sound chip and played during the process of cooking to provide step by step cooking instructions. The sounds generated can also be advertising messages, for example a musical jingle or a company's verbal slogan for a specific product can be programmed on the sound chip and played to amuse and to advertise. The sound(s) generated by the oven mitt and/or pot holder can be activated while a user is in the process of cooking, by the user simply grabbing hold of an object. The sound(s) generated by the oven mitt and/or pot holder can be turned off completely, by manually activating an on/off switch, so that they are not activated by simply grabbing hold of an object in the process of cooking. The light can be generated by the user for amusement and can be programmed to blink in different patterns to correspond to the sounds generated. The light can also be generated for practical purposes to more carefully observe the food while it is in the oven, microwave, refrigerator, on the barbeque, or at any time during food preparation.

The sound and/or light, with or without video, generating protective oven mitt and/or pot holder is designed to be used both in the home, outside at a barbeque, and in commercial establishments involved with food preparation or food serving and to be used as a promotional giveaway or advertising item by a company, restaurant or establishment or as an actual greeting card. The protective mitt and/or pot holder can either be made of a solid color fabric or be with a printed fabric and the fabric decorations will be thematically related to the sounds and/or lights generated from that particular protective mitt. Or the fabric can be printed with a corporation logo for advertising purposes. Attached to the oven mitt and/or pot holder, connected on a loop or other area, there could be a printed card allowing the oven mitt and/or pot holder to be used as an actual greeting card. For example a mitt or pot holder that has balloons and birthday cakes on the fabric would have musical and verbal sounds generating that are related to birthday themes. A removable card, attached to the loop, could have a birthday salutation on it, with room for the user to write to whom the mitt and/or pot holder is for and a place to sign their own name as well. A Christmas protective oven mitt and/or pot holder would have fabric associated with the holiday such as red and green, or candy canes or Christmas trees or ornaments and the sounds generated by a Christmas themed protective mitt would have Christmas related music clips and verbal expressions and musical sounds related (for example bells). The Christmas protective oven mitt and/or pot holder would have red, green and/or white lights to be thematically tied to the Christmas theme and/or to provide practical light. The Christmas hand protective oven mitt and/or pot holder would have a Christmas greeting card attached. Mother's Day, Valentine's Day, Halloween, Fourth of July, Easter, Hannukah, Passover, Kwanzaa and thematic Anniversary, Wedding, Baby Shower, Housewarming themes, all can have their own individually designed protective mitt and/or pot holder with customized sound. The oven mitt and/or pot holder with sound and light, with or without video, can also be thematically tied into an array of animals or creatures, such as a cat, dog, moose, dinosaur, robot or mythic, animated or fictional character or real person, such as an actor, president or singer.

The oven mitt and pot holder with sound and/or light and/or video can also be the perfect tourist souvenirs to remember a certain location, such as an amusement park, hotel, restaurant, bar, a specific city, state, national park or country. The San Francisco protective oven mitt and/or pot holder would have images that evoke the city, such as the Golden Gate Bridge, and the sounds would include thematic music about San Francisco and the trolley-car bells. The attached card would be a related Golden Gate image and salutation, with room for the user to write on. The Yosemite protective oven mitt and/or pot holder would have images of wilderness or animals on the fabric and the sounds would be musical or animal sounds relating to the park, animals or wilderness. The name of the specific location or character, or person can be printed on the fabric as well as on the greeting card to make this the ideal souvenir.

Audio and video images can be generated in the protective oven mitt and/or pot holder that includes an electronic video display screen and digital video media storage. Audio and video images can be generated in the protective oven mitt and/or pot holder that includes a television. Data stored in the protective oven mitts and/or pot holders with an electronic video display screen and digital video media storage would also be thematically tied in to whatever theme is chosen; a holiday, special occasion, souvenir, animal or advertisement. Data stored in the protective oven mitts and/or pot holders with an electronic video display screen and digital video media storage can also be use to give the user recipes and cooking instructions.

For advertising purposes, to promote a particular company or corporation, product, TV show or Movie, the logo or mascot of the company and/or product name and a thematic design associated with a company or product may be printed on the fabric of the protective oven mitt and/or pot holder. For advertising purposes, the sounds and/or lights and/or video images generated from the sound and or video-imaging device would compliment the company, TV show, Movie or product, for example it would be the company's musical theme jingle, or verbal expressions associated with the company or its products, or an audio and/or video clip. For example, the Big Burger corporation could advertise their company and food by printing their double B logo, and their smiling burger mascot on the fabric of the oven mitt and/or pot holder and the sound generating device would include their commercial musical jingle, with the lyrics of "Big Burger makes the best burgers . . . . "

When a person is cooking alone, or with others, they often want to listen to specific sounds, such as a cooking program, radio music or speech broadcast on a radio, the protective oven mitt and/or pot holder, with either the built-in radio, lets a user do that.

When a person is cooking alone, or with others, they often want to listen to specific sounds, such as cooking instruction, music or speech, from an MP3 player, the protective oven mitt and/or pot holder, with either the built-in radio or MP3 player or other media storage device, lets a user do that.

When a person is cooking alone, or with others, they often want to listen and see specific sounds and visual images, such as cooking instructions or entertainment or sports. The protective oven mitt and/or pot holder, with either the built-in digital video player or built in television, lets a person who cooks listen and watch entertainment or cooking instructions and demonstrations.

When a person is cooking alone, or with others, they often want to communicate with other people who are not close by. The protective oven mitt and/or pot holder, with a built-in Walkie-Talkie lets a user communicate with others who are not close by for cooking instruction, information or entertainment.

SUMMARY OF THE INVENTION

Entertainment value, and/or practical illuminating value, and/or promotional or advertisement purposes, are objects of the present invention to provide for a sound and/or light and/or video device embedded or attached to a hand protective cooking apparatus: oven mitt, glove, mitten, pot holder or the like. Toward these ends, the present invention comprises a sound generating and/or light and/or video generating apparatus comprising an hand protective cooking apparatus adapted to be held or worn on a user's hand; an electronic assembly attached to said article; structure for generating sound and/or light, and/or video within said electronic assembly; and structure for allowing the user to actuate said means for generating sound and/or light and/or video within said electronic assembly. The present invention also comprises a card attached that has a printed design and/or salutation or saying, with room for the user to write-on, which then allows the present invention to be used as an actual greeting card.

It is yet another object of the present invention to provide a built-in sound generating device for use with a hand protective cooking apparatus: an oven mitt, glove, mitten, pot holder, which can play a variety of sounds, which can be either or both entertaining and practical.

It is yet another object of the present invention to provide a built-in sound generating device for use with a hand protective cooking apparatus: an oven mitt, glove, mitten, pot holder, which can play a variety of sounds, which can be either or both entertaining and practical and the sound is generated by the user in the processing of cooking, simply by grabbing hold of an object.

It is yet another object of the present invention to provide a built-in light generating device for use with a hand protective cooking apparatus: an oven mitt, glove, mitten, pot holder or the like, which can be either or both entertaining and practical.

It is yet another object of the present invention to provide a built-in light generating device for use with a hand protective cooking apparatus: an oven mitt, glove, mitten, pot holder or the like, with a built in Micro-Controller for programming the lights to blink in different patterns to correspond with the different preprogrammed sounds, in order to be even more entertaining.

It is yet another object of the present invention to provide a built-in radio for use with a hand protective cooking apparatus: an oven mitt, glove, mitten, pot holder or the like, which can be either or both entertaining and practical.

It is yet another object of the present invention to provide a built-in MP3 player or other media storage device for use with a hand protective cooking apparatus: an oven mitt, glove, mitten, pot holder or the like, which can be either or both entertaining and practical.

It is yet another object of the present invention to provide a built-in television for use with a hand protective cooking apparatus: an oven mitt, glove, mitten, pot holder or the like, which can be either or both entertaining and practical.

It is yet another object of the present invention to provide a built-in Video Device, which includes video storage and a display screen for use with a hand protective cooking apparatus: an oven mitt, glove, mitten, pot holder or the like, which can be either or both entertaining and practical.

It is yet another object of the present invention to provide a built-in walkie-talkie for use with a hand protective cooking apparatus: an oven mitt, glove, mitten, pot holder or the like, which can be either or both entertaining and practical.

It is yet another object of the present invention to provide a business advertising method to promote a user's company and/or products by printing the fabric of the hand protective cooking apparatus: an oven mitt, glove, mitten, pot holder glove, or the like with the company name and/or logo, and/or mascot and/or product image and by having the sounds and/or visuals generated by the device to promote the product(s) in entertaining and/or informative ways.

Additional objects, advantages and novel features of the present invention will be set forth in part in the description which follows, and in part will become apparent to those skilled in the art upon examination of the following, or may be learned from practice of the invention.

DESCRIPTION OF THE DRAWINGS

In the accompanying drawings which form a part of the specification and are to be read in conjunction therewith and in which like reference numerals are used to indicate like parts in the various views.

DESCRIPTION OF THE INVENTION

Figure 1:
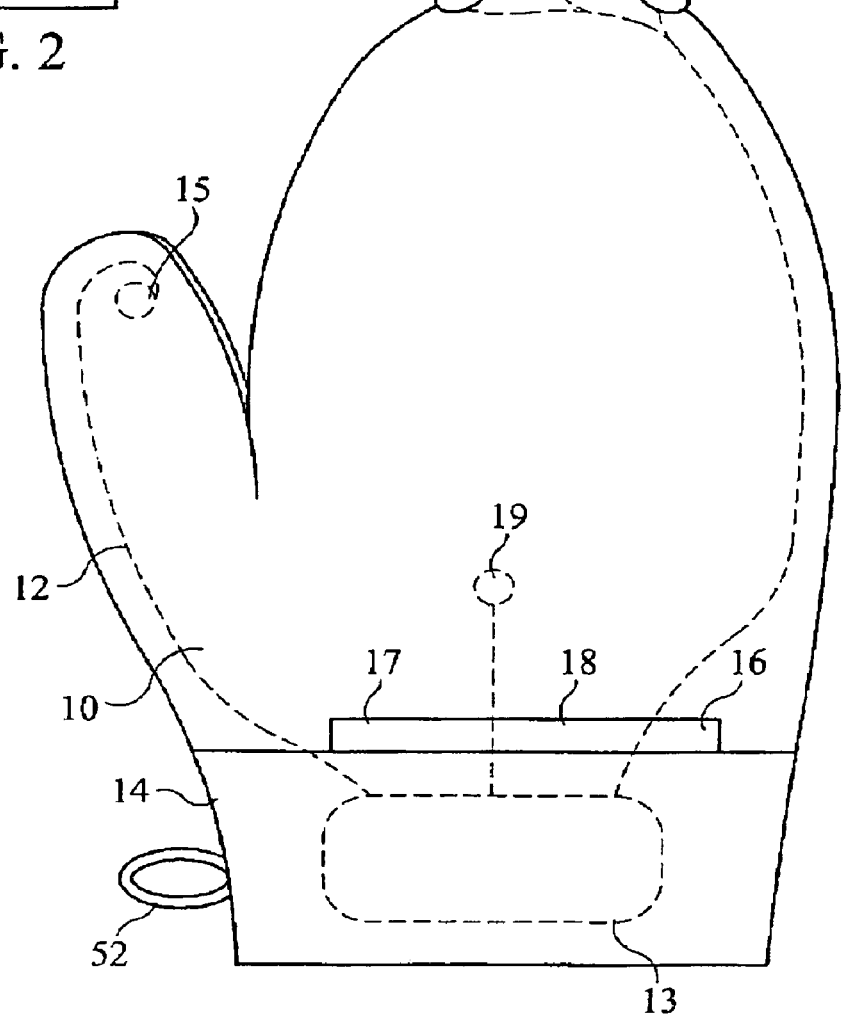
FIG. 1 is an illustration of the present invention.

As shown in FIG. 1, the present invention includes a hand protective cooking apparatus: an oven mitt, glove, pot holder, mitten, body (10), and a self-contained electronic assembly (13) secured to the protective body (10). The electronic assembly (13) may be secured to the hand protective body by various methods, including, but not limited to, adhesives, hook and eye closure, stitching, riveting or embedded in a pocket or embedded in the protective body.

In this configuration, the hand protective oven mitt body (10) includes a single finger sheath large enough to hold four fingers (11) and a thumb sheath (12). In the case of a glove, the glove body (10) includes four finger sheaths and a thumb sheath. In the case of a pot holder, the protective apparatus is held by a user's hand, as opposed to enveloped, and is often square or rectangular in shape, but can be round, oval or of another shape.

As shown in FIG. 1, the present invention includes an hand protective holder, oven mitt or glove body (10) and can also include a loop (52), which can be used to hang up the protective oven mitt and/or pot holder, and is used to secure a paper or cardboard card with a printed salutation or saying and a place for the user to write on, which in turn allows the present invention to serve as a greeting card.

As shown in FIG. 1, the present invention includes a hand protective holder, oven mitt or glove body (10), and one or more light sources (37). These light sources may be secured to the finger sheath(s), thumb sheath or mitt body by various methods, including, but not limited to, embedded in the tips of the mitt finger sheath(s), thumb sheath and/or mitt body or secured anywhere on the mitt by adhesives, prongs, hook and eye closure, stitching, or riveting.

With reference to FIG. 1, a pocket (16) is formed on the hand protective body. Pocket (16) includes an opening (17) through which the electronic assembly (13) can be accessed in order to remove, replace or insert a battery. The pocket (16) also allows the self-contained electronic assembly (13) to be inserted and/or replaced and/or removed. Preferably, the outer layer of the pocket is a heat protective fabric to withstand going in and out of an oven and is porous enough fabric material (14) to enable the sound generated by electronic assembly (13) to emanate unhindered from a pocket (16). The pocket (16) may include a sealing device, such as a zipper, Velcro, or hook and eye closure (18), to ensure securement of electronic assembly (13) within the pocket (16).

Figure 2:
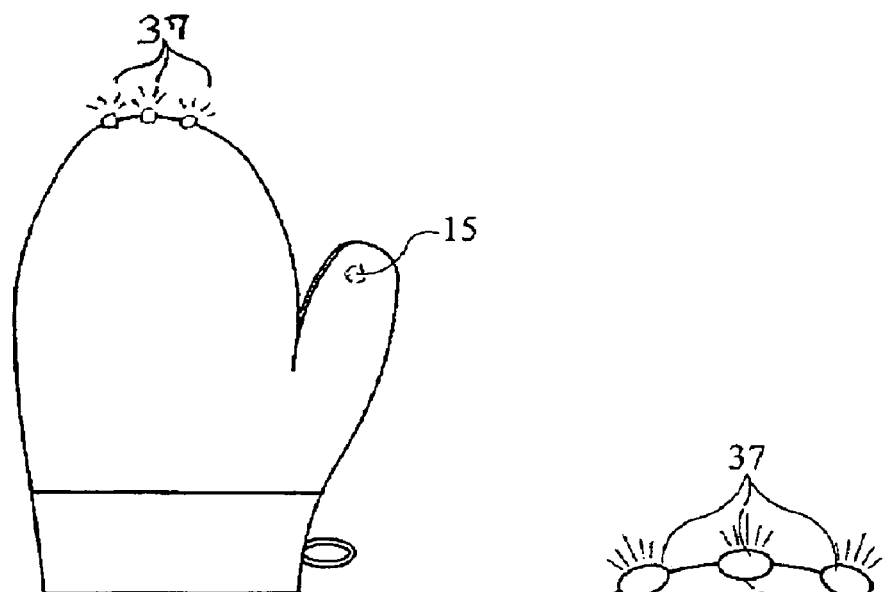
FIG. 2 is an illustration of the palm side up, thumb portion of the present invention.

As shown in FIG. 2, the palm side of the thumb portion of the present invention of the hand protective holder, oven mitt or glove illustrated.

In FIG. 1 and FIG. 2, the hand protective body further comprises contact switches, corresponding to the various functions the mitt can perform (sound and light). The contact switches (19) and (15) are sensitive to pressure and a circuit is completed when pressure is applied to the specified locations on the hand protective body. The completion of a circuit sends a signal to the electronic assembly (13). For example switch (15) in the thumb sheath triggers the sound function. Or it can be set up to trigger both sound and blinking or steady light functions. Switch (19) in the top of the protective oven mitt triggers the light to go on or off. The switch placement can be in these locations or in many other locations on the oven mitt. The number of switches can be increased or decreased and their exact functions of activating light and/or sound can be interchanged as well.

In the preferred embodiment, the switch (15) for activating the sound, with or without light, is embedded in the thumb sheath (12) and it would be in the area of the user's thumb pad, located on the palm side of their hand. Placing the sound switch (15) at the palm side of the thumb pad area will allow the user to activate the sound as the user is in process of grabbing hold onto objects while cooking, which brings a sense of surprise, fun and entertainment to the process of cooking. The sound switch placement can be in this thumb pad location or in many other locations on the oven mitt.

Figure 3:
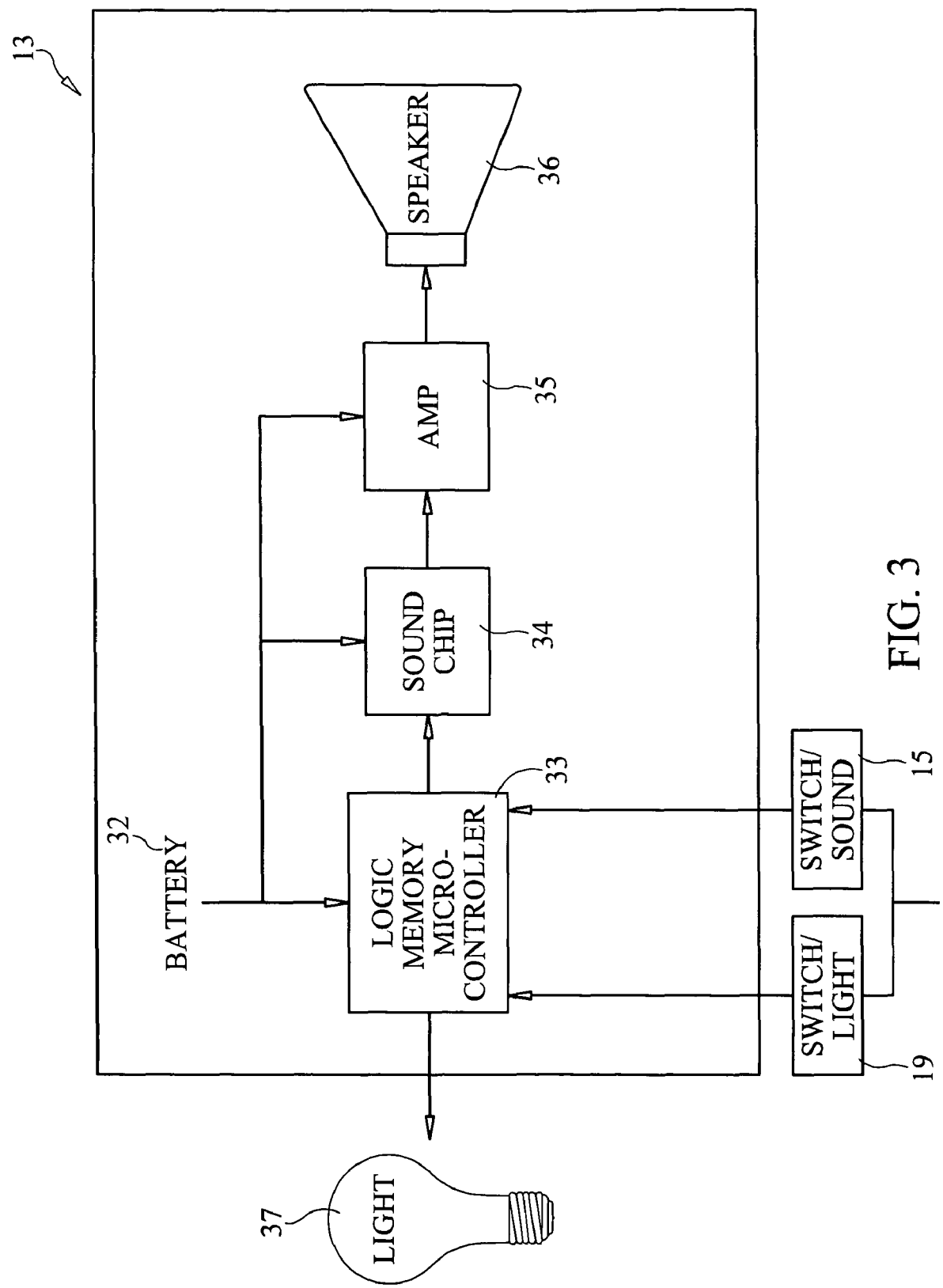
FIG. 3 is an electrical diagram of an electronic assembly for use in the present invention with both sound and light generating systems.

With reference to FIG. 3, the self-contained electronic sound assembly (13) includes a power source/battery (32), a sound chip (34) for sound storage, a microprocessor or an electronic Logic Memory Micro-Controller (33) for determining which sound and/or light to activate, an amplifier (35) and an Audio Speaker (36). Power Source (32) may be one or a plurality of batteries electrically connected with the sound chip (34), the micro-processor or Micro-Controller (33), the amplifier (35), the audio speaker (36), and the light source (37) for powering the same. Switch (15) is connected to the electronic assembly (13), and is used to activate the Micro-Processor (33) when it is desired by the user to produce an audio output. Switch (19) is likewise connected to the electronic assembly (13), and is used to activate the Micro-Controller processor (33) when it is desired by the user to illuminate light source (37).

With reference to FIG. 3, the Micro-Controller processor (33) is electrically connected to switch (15) and the audio speaker (36). Sound chip (34) has stored sounds, such as music or verbal phrases. The sound chip (34) drives the stored sound pulse or sound sequence into the audio speaker. The construction of electronic circuits (34) and (33) is of the type well-known in the art. The audio speaker (33) is electrically connected to, and driven by, electronic Micro-Controller (33), and electrically connected to the power source/battery (32).

In an alternate embodiment of the invention, a plurality of light sources (37) may be employed, with the light sources being of a plurality of colors. When the light switch (19) is activated by the user, the various light sources may turn on or off, or they may blink according to a predetermined program (s) that are embedded in the Micro-Controller processor (33).

In an alternate embodiment of the invention, a plurality of light sources (37) may be employed, with the light sources being of a plurality of colors. When the sound switch (15) is activated by the user, the various light sources may blink according to a various predetermined programs embedded in the Micro-Controller processor (33) to correspond to the predetermined programmed sounds that are embedded in the Micro-Controller processor (33).

Figure 4:
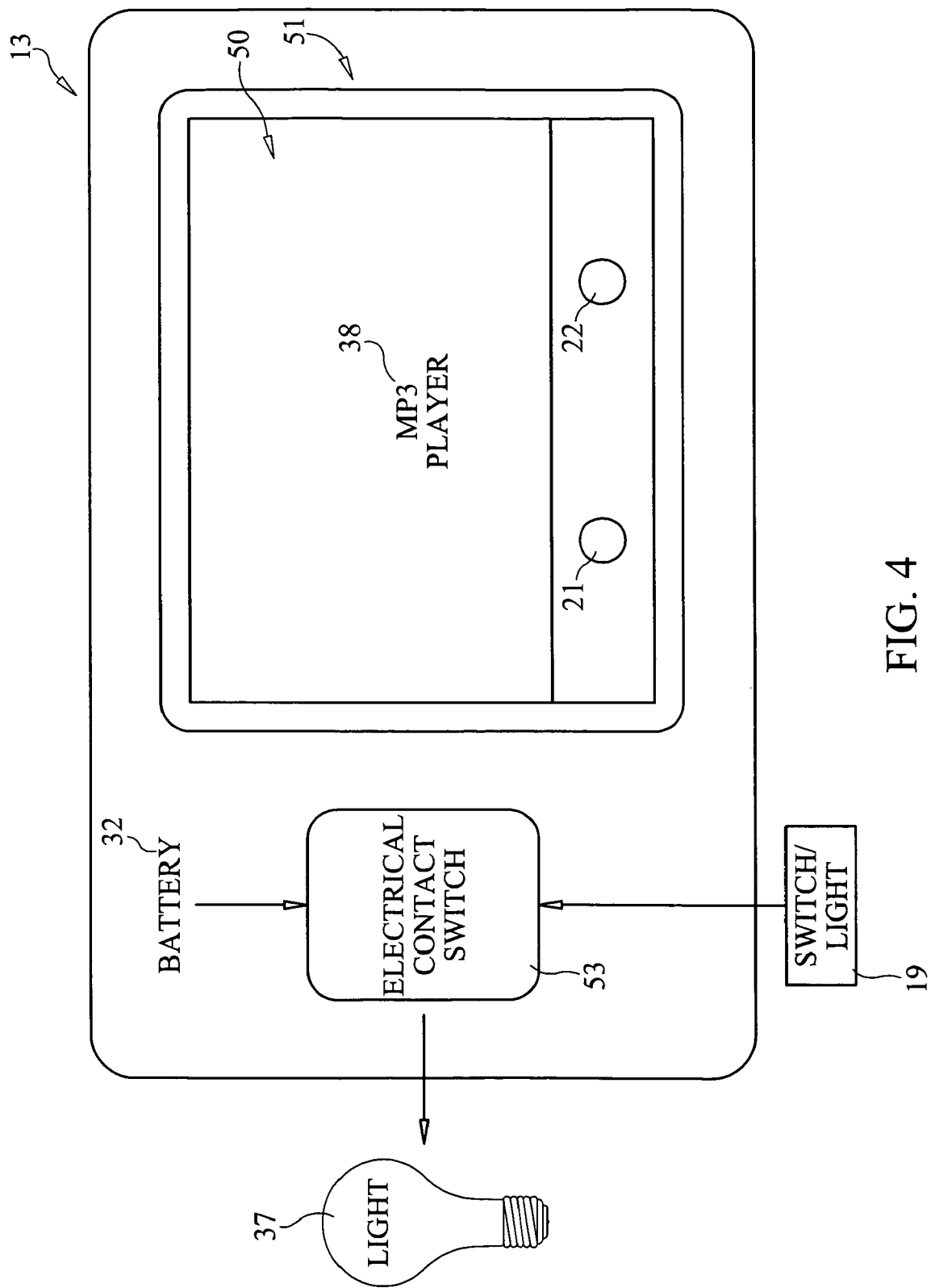
FIG. 4 is an electrical diagram of an electronic assembly for use in the present invention with both sound and light generating systems, whereby the sound generating device is an MP3 player or other media storage device.

In an alternate embodiment of the apparatus, an MP3 player or alternative media storage device (38) may be employed. With reference to FIG. 4, when the MP3 player (38) is employed the electronic assembly (13) is comprised of a radio (38), along with a power source or battery (32) and an electrical contact switch (19) to activate the light(s) (37). When the MP3 player or alternative media storage device switches (21) and (22) are activated by the user, the embedded MP3 player (38) is turned on or off and the specific song or sound media is chosen. The MP3 is embedded into the hand protective oven mitt by being secured with seaming and/or glue and/or adhesive (51). The MP3 player or alternative media storage device (38) is framed in such a way that a viewing screen (50) can be seen directly, or through a clear material.

Figure 5:
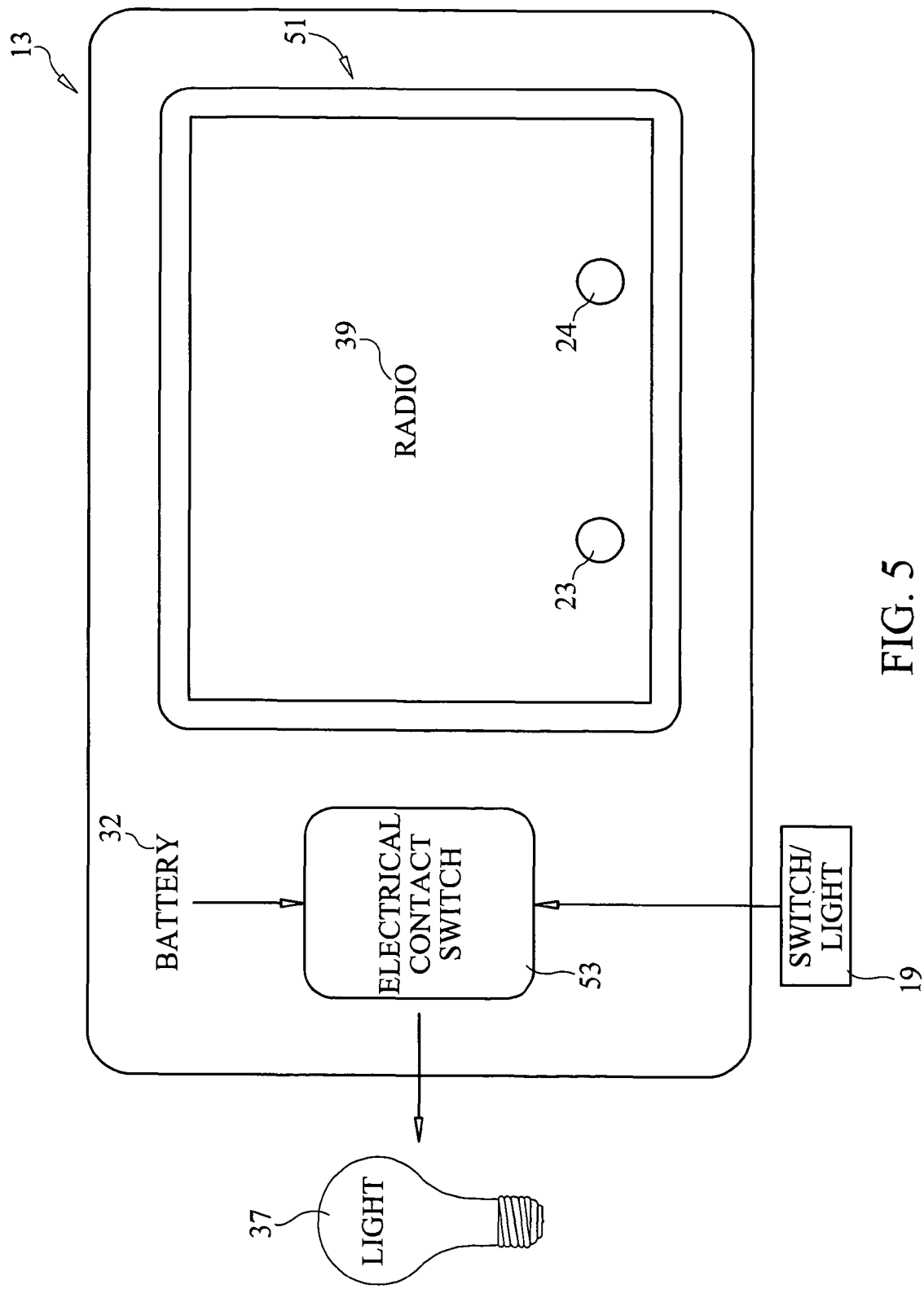
FIG. 5 is an electrical diagram of an electronic assembly for use in the present invention with both sound and light generating systems, whereby the sound generating device is a radio.

In an alternate embodiment of the apparatus, a radio (39) may be employed. With reference to FIG. 5, when the radio switches (23) and (24) are activated by the user, the radio (39) is turned on or off and the specific broadcast channel is chosen.

Figure 6:
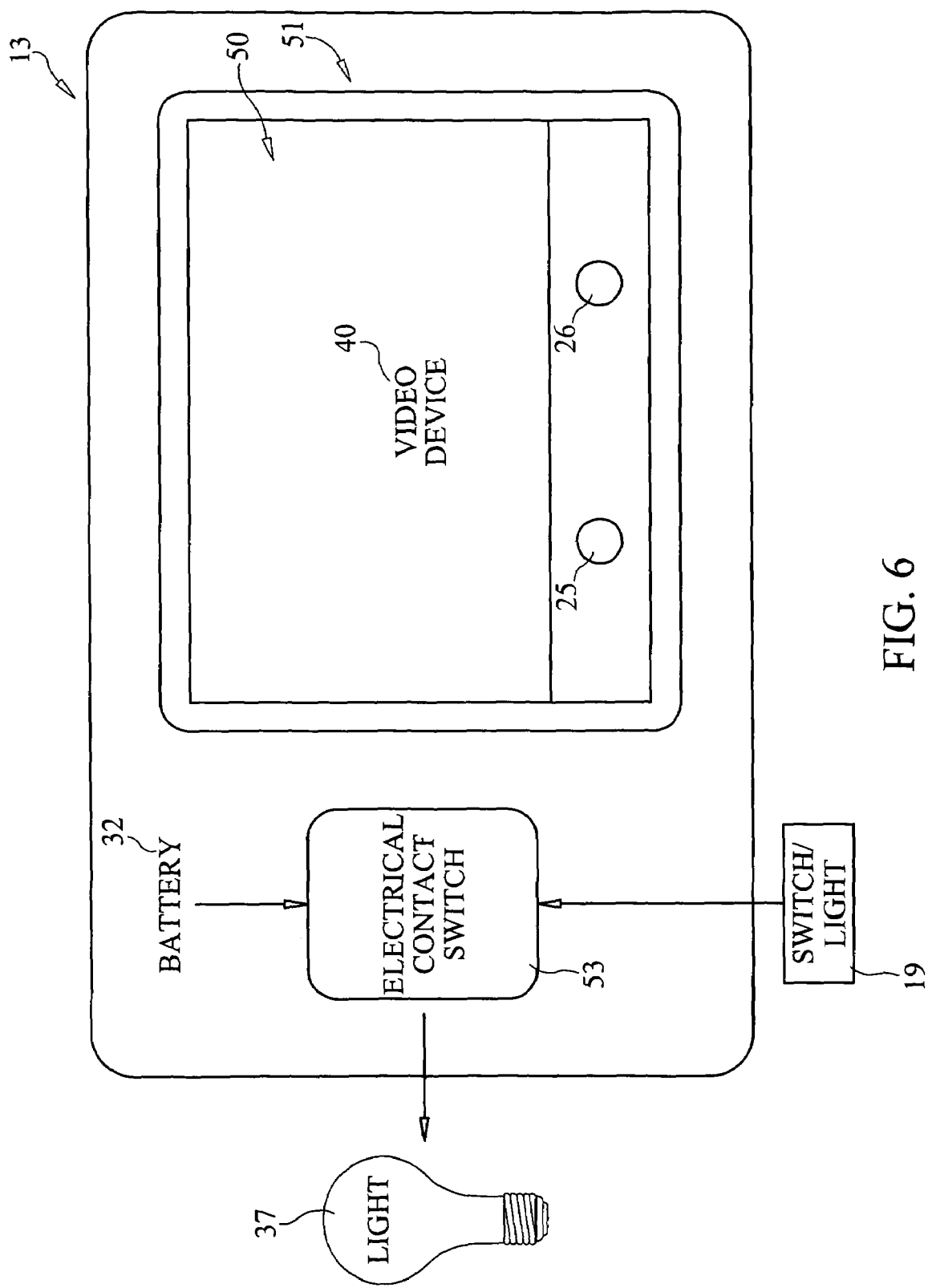
FIG. 6 is an electrical diagram of an electronic assembly for use in the present invention with both sound and light generating systems, whereby the sound generating device is a Video Device.

In an alternate embodiment of the apparatus, a video device (40) may be employed. With reference to FIG. 6, when the video device switches (25) and (26) are activated by the user, the embedded video device (40) is turned on or off (with or without volume control) and the specific video media or channel is chosen. The visuals are seen on the embedded display screen of the video device (40).

Figure 7:
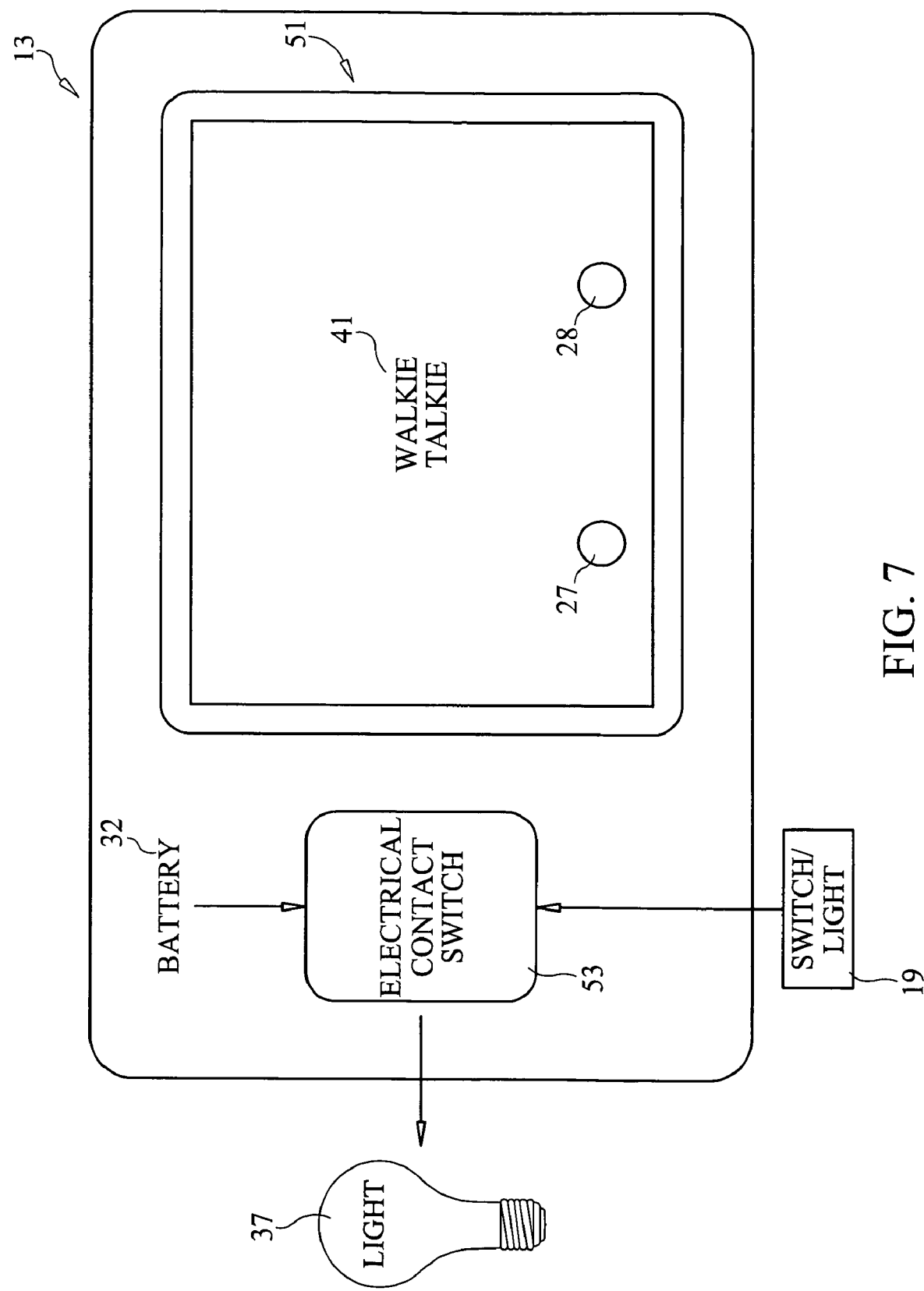
FIG. 7 is an electrical diagram of an electronic assembly for use in the present invention with both sound and light generating systems, whereby the sound generating device is a Walkie-Talkie.

In an alternate embodiment of the apparatus, a Walkie-Talkie (41) may be employed. With reference to FIG. 7, when the Walkie-Talkie switches (27) and (28) are activated by the user, the embedded walkie-talkie (41) is turned on or off and the specific channel is chosen.

Figure 8:
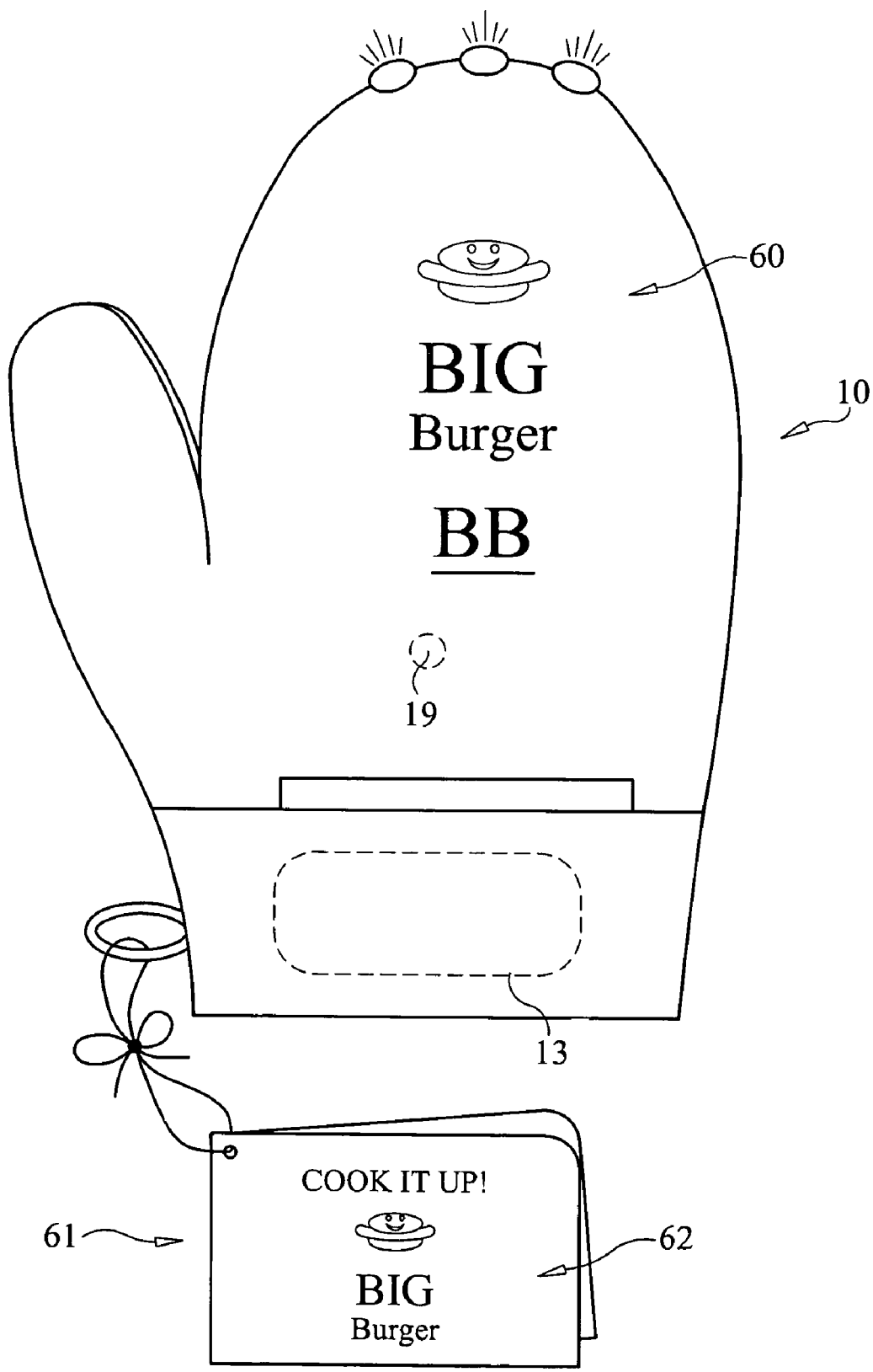
FIG. 8 is an illustration of the present invention as a business advertising method.

In an alternate embodiment of the apparatus, a business advertising method may be employed. With reference to FIG. 8, when a business advertising method is employed, the invention includes a hand protective cooking apparatus body (10), with a company logo, name and/or mascot are printed on the fabric (60), a secured self-contained electronic assembly (13), in which the sounds and/or video images generated are thematic to the advertisement, in this case Big Burgers. The company's commercial musical jingle and other thematic audio messages and tunes would be generated. In addition, thematic advertising visuals can be incorporated in this embodiment of the business advertising method, such as the attached greeting card (61) which has the company's logo and/or slogan (62) printed on it.

Figure 9:
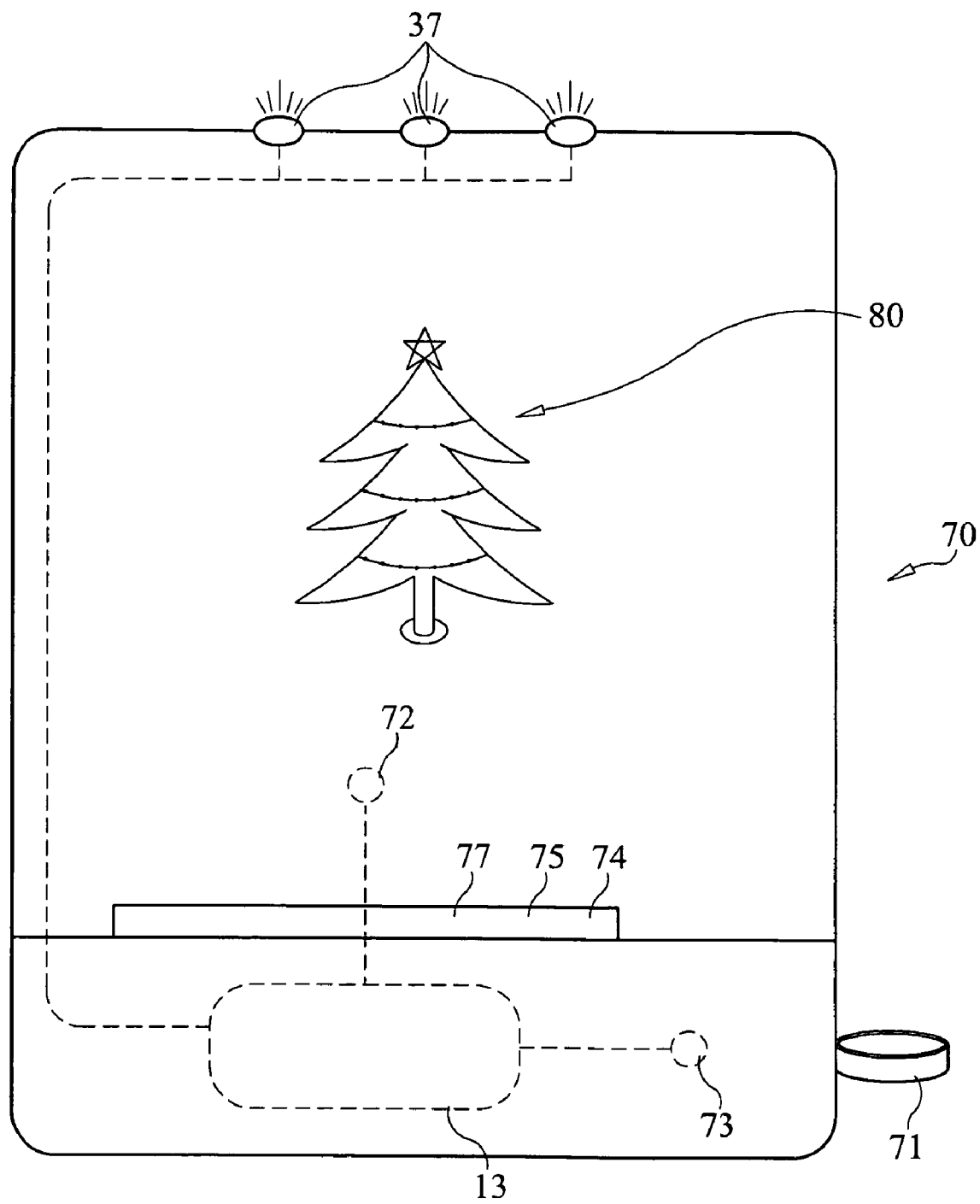
FIG. 9 is an illustration of the present invention in the form of a Pot Holder.

In an alternate embodiment of the apparatus, a Pot Holder may be employed. With reference to FIG. 9, the invention includes a hand protective apparatus which is a pot holder body (70), and a self-contained electronic assembly (13) secured to the hand protective body (70). The electronic assembly (13) may be secured to the protective body by various methods, including, but not limited to, adhesives, hook and eye closure, stitching, riveting or embedded in a pocket or embedded in the hand protective body. As shown in FIG. 9, the present invention includes a hand protective pot holder body (70) and can also include a loop (71), which can be used to hang up the insulating mitt and/or pot holder, and is used to secure a paper or cardboard card with a printed salutation or saying and a place for the user to write on, which in turn allows the present invention to serve as a greeting card.

As shown in FIG. 9, the present invention includes a hand protective pot holder body (70), and one or more light sources (37). These light sources may be secured to the pot holder body (70) by various methods, including, but not limited to, embedded in the edge of the body or secured anywhere on the pot holder by adhesives, hook and loop closure, stitching, or riveting.

In FIG. 9, the hand protective pot holder body further comprises contact switches, corresponding to the various functions the pot holder can perform (sound and light). The contact switches (72) and (73) are sensitive to pressure and a circuit is completed when pressure is applied to the specified locations on the insulating body. The completion of a circuit sends a signal to the electronic assembly (13). For example switch (72) triggers the sound function. Or it can be set up to trigger both sound and blinking or steady light functions. Switch (73) in triggers the light to go on or off. The switch placement can be in these locations or in many other locations on the hand protective pot holder. The number of switches can be increased or decreased and their exact functions of activating light and/or sound can be interchanged as well.

With reference to FIG. 9, a pocket (74) is formed on the hand protective body. Pocket (74) includes an opening (75) through which the electronic assembly (13) can be accessed in order to remove, replace or insert a battery. The pocket (74) also allows the self-contained electronic assembly (13) to be inserted and/or replaced and/or removed. Preferably, the outer layer of the pocket is a porous enough fabric material (76) to enable the sound generated by electronic assembly (13) to emanate unhindered from a pocket (74). The pocket (74) may include a sealing device, such as a zipper, Velcro, or hook and eye closure (77), to ensure securement of electronic assembly (13) within the pocket (74). A thematic or advertising visual (80) is printed on the fabric of the pot holder body (70). A corresponding thematic sound would be generated from the electric assembly (13).

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Description of Electronics Sound System and/or Light and/or Video System Components 1. Oven Mitt: An Oven Mitt is a hand protective apparatus. An Oven Mitt is a hand protective glove that allows a user to handle hot objects, such as cooking utensils, pans, pots, containers or foods and to manually handle hot objects near or in and out of ovens, grills and barbeques. It is typically comprised of an exterior layer of fabric, an interior section of insulating material and an interior layer of fabric, it can often be quilted, but is not necessarily quilted. The Oven Mitt is a hand protective apparatus that is able to withstand heat of at least 300 degrees Fahrenheit for a minimum of 30 seconds, without causing pain to the user and without scorching or burning the apparatus. Even higher heat and time thresholds are possible and may be preferred. The fabric may be made of cotton, or of other materials. A thermal radiation barrier to protect against scorching of the material, may be made of a metal coated fabric or film, for example aluminized cotton or polyester, aluminized kapton or mylar. An insulating barrier to protect against heat in the gripping area may include an elastomeric material, such as silicone, rubber or urethane. The insulating material may also be made of cotton batting or of other insulating materials. Other designs of insulating mitts exist different than the above described. The preferred embodiment of the invention uses the described type of fabric, insulating material, fabric structure, but this is not mandatory during manufacturing. An Oven Mitt typically is comprised of a hand protective body, that includes a single finger sheath large enough to hold four fingers, and a thumb sheath. An Oven Mitt can also be in the shape of a glove, in which the glove body includes four finger sheaths and a thumb sheath. An Oven Mitt envelopes a user's entire hand for heat protective purposes.

2. Pot Holder: A Pot Holder is a hand protective apparatus. A Pot Holder is a small cloth pad, held by the hand that allows a user to handle hot objects, such as cooking utensils, pans, pots, containers or foods and to manually handle hot objects, typically near or in and out of ovens, grills and barbeques. A Pot Holder is typically comprised of an exterior layer of fabric, an interior section of heat barrier or insulating material and an interior layer of fabric, it can often be quilted, but is not necessarily quilted. The Pot Holder is a hand protective apparatus that is able to withstand heat of at least 300 degrees Fahrenheit for a minimum of 30 seconds, without causing pain to the user and without scorching or burning the apparatus. Even higher heat and time thresholds are possible and may be preferred. The fabric may be made of cotton, or of other materials. A thermal radiation barrier to protect against scorching of the material, may be made of a metal coated fabric or film, for example aluminized cotton or polyester, aluminized kapton or mylar. An insulating barrier to protect against heat in the gripping area may include an elastomeric material, such as silicone, rubber or urethane. The heat barrier or insulating material may also be made of cotton batting or of other insulating materials. Other designs of insulating mitts exist different than the above described. The preferred embodiment of the invention uses the described type of fabric, heat barrier or insulating material, fabric structure, but this is not mandatory during manufacturing. A Pot Holder is a hand protective apparatus held by a user's hand and is often square or rectangular in shape, but can be round, oval or of another shape. A Pot Holder is held by a user for heat protective purposes.

3. Switch: A switch is used to complete the circuit that activates the sound chip and/or the light source. The switch may be a contact switch or a proximity switch. Separate switches may be provided for independent control of the light source and the sound chip.

4. Logic Memory Micro-Controller or Micro-Controller or Electronic Circuit: The hand protective apparatus's micro-controller or electronic circuit responds to a signal from the switch and determines (based on an embedded software program) which song or phrase or sound to play from the sound chip. (An organized or random order of sounds and/or sound and light activating combinations can be programmed into the software.)

5. Sound Chip: The sound chip is a memory device that stores all of the hand protective apparatus's songs, phrases, messages and/or instructions. The sound chip receives commands from the micro controller and outputs a signal to a small amplifier in order to generate the appropriate sound. (Note: In the prototype, there is a 1 minute sound chip, when manufacturing the various versions of the hand protective cooking apparatus oven mitt and/or pot holder with sound, a 1 or 2, 3, 5 or 30 minute sound chip is recommended. The price for these 1, 2, 3, 5 or 30 minute sound chips are a very reasonable, low cost price.)

6. Amplifier: The small solid state amplifier receives a signal from the sound chip and boosts the signal so that it is strong enough to power the speaker at an appropriate volume.

7. Speaker and Speaker Box: The speaker is a 1.4 inches round flat speaker, but in the manufacturing the speaker can be smaller or larger, or of another shape if desired.

8. Battery or Power Source: The hand protective cooking apparatus is powered by one or two button style batteries, which are inside the mitt near the wrist area and embedded in a closed pocket. The batteries give power to the micro controller, the sound chip and the amplifier. The batteries can be replaced easily.

9. Light Source(s): The light sources connected to the hand protective apparatus can either be light emitting diode (LED), high intensity LED, fluorescent or incandescent, electro-luminescent or any other type of electrically powered light source is connected at the tip area of the four-finger sheath section of the mitt, or the thumb sheath section, however, the light source can be placed anywhere or in numerous places on the hand protective oven mitt, glove, mitten, pot holder or the like.

10. Electronic Assembly (13): An electronic assembly is a compilation of parts that are concerned with electrons. For example, the electronic assembly (13) in FIG. 2 is comprised of the power source, the logic and memory chip, the sound chip, the amplifier and the speaker. The electronic assembly receives inputs from the sound switch (15) and/or the light switch (19) and/or other switches.

11. Radio: The radio is a device that receives a non-audio electro-magnetic signal and then converts the signal into sound.

12. Video Device: A Video Device is any electronic device with a video display screen, including: a television, digital media player, digital video storage device, computer, blackberry, PDA, cell phone. These devices may or many not include audio capabilities.

13. Walkie-Talkie: The walkie-talkie is a handheld, radio-transceiver for communication between two or more users.

What is claimed is:

1. A glove to be worn over the hand comprising: a palm side and a back-of-the-hand side, and at least one light source positioned on the seam over the fingers and extending from the seam, an electronic assembly attached to the glove, said electronic assembly comprising a light generating circuit and at least one power source.

2. A glove of claim 1, wherein at least one switch is attached to the glove that allows the user to actuate the light source.

3. A glove of claim 1, wherein the wiring is hidden in the seam.

4. A glove of claim 1, wherein at least one light source is an LED.

5. A glove of claim 1, wherein at least one light source is a color other than white.

6. A glove of claim 1, wherein the glove further comprises a pocket that is constructed of a clear material.

7. A glove of claim 1, wherein the device further comprises an electronic assembly, wherein the electronic assembly comprises at least one of the following: a radio, an MP3 player, a digital storage device, video storage device, a television, a handheld radio-transceiver which can transmit sound between at least two people.

8. A glove of claim 7, wherein the glove further comprises a pocket which contains at least one of the following: a radio, an MP3 player, a digital storage device, a video storage device, a television, a handheld radio-transceiver which can transmit sound between at least two people, and wherein the contents of the pocket are visible through the pocket.

9. A glove of claim 1, wherein the device further comprises an electronic assembly, wherein the electronic assembly comprises a system to record and play original audio.

10. A glove of claim 1, wherein an advertising message is incorporated with a visual design on the glove.

11. A glove of claim 1, wherein a greeting card is attached to the glove and can be coordinated with a visual design on the glove.

12. A glove of claim 7, wherein an advertising message is incorporated into at least one of the following: an audio player, a video player.

13. A glove of claim 7, wherein the glove further comprises a pocket which contains at least one of the following: a radio, an MP3 player, a digital storage device, a video storage device, a television.

14. A glove of claim 1, wherein the glove is made of insulating fabric.

15. A glove of claim 1, wherein at least one light can blink according to a predetermined program that is embedded on a micro-controller processor in the electronic assembly.

16. A glove of claim 7, wherein at least one light can blink according to a predetermined program that is embedded on a micro-controller process in the electronic assembly, at the same time a sound is produced from one of the following: a radio, an MP3 player, a digital storage device, a video storage device, a television.

17. A glove to be worn over the hand comprising: a palm side and a back-of-the-hand side, and at least one light source emanating light from the peripheral edge where the palm side and back-of-the-hand side meet over the fingers, an electronic assembly attached to the glove, said electronic assembly comprising a light generating circuit and at least one power source.

18. A glove of claim 17, wherein the glove is made of insulating fabric.

19. A glove of claim 17, wherein the device further comprises an electronic assembly, wherein the electronic assembly comprises at least one of the following: a radio, an MP3 player, a digital storage device, video storage device, a television, a handheld radio-transceiver which can transmit sound between at least two people.

20. A glove of claim 17, wherein the device further comprises an electronic assembly, wherein the electronic assembly comprises a system to record and play original audio.

21. A glove of claim 17, wherein at least one light source is an LED.

* * * * *